> United States Patent Office 2,895,603
Patented July 21, 1959

2,895,603

USE OF CELLULAR MATERIAL IN PACKAGING ARTICLES

Stephen E. Freeman, Milwaukee, Wis., assignor to Freeman Chemical Corporation, a corporation of Wisconsin Application January 15, 1957, Serial No. 634,280

14 Claims. (Cl. 206—46)

This invention relates to methods of packaging articles with polyurethane foam of selected tensile strength and density values, and the packages produced by said methods.

My invention contemplates forming a package by a method that, briefly, comprises: positioning the article to be packaged in a container, introducing a desired amount of polymeric-isocyanate mix into the container so that the hydroxyl groups, carboxyl groups or other reactive groups of the polymeric material, and water which may be present in the mix, will react with the isocyanate component to form insoluble, flexible polyurethane foam which surrounds the gas bubbles generated in the reaction; permitting the polyurethane foam to be formed in such a manner that the article is surrounded thereby; and closing the container so as to form a package.

The article to be packaged may be placed in a protective, flexible bag (e.g., polyethylene, etc.) which is impervious to the polymeric-isocyanate mix.

A support, which may be star-shaped, circular, cross-shaped, etc., for the article to be packaged may be placed in a container made of paper, wood, laminated plastic, steel, and the like. The support serves to hold the article off the bottom of the container during the formation of the polyurethane foam and may be formed of paper having serrated or scalloped edges so as to permit the polyurethane foam to be formed between the bottom of the article and container. If desired, the support may consist of: a piece of preformed polyurethane foam; a piece of preformed, reinforced polyurethane foam formed by foaming a polymeric-isocyanate mix around a mat of curled fibers; or a mat of curled fibers. When foaming is complete, the article is essentially supported by polyurethane foam, consequently, the support member need only have strength sufficient for temporary use. The support should not be firm or stiff so as to reduce or obviate the transmission of mechanical shock from the container proper to the article. In the event the article to be packaged is light, there may not be a need for a support since the foaming action of the polymeric-isocyanate mix may serve to raise the article off the bottom of the container.

After the article to be packaged is positioned in the container, an interlacement of curled hair, curled nylon fibers, curled Dacron, and the like may be placed in the container so that the polymeric-isocyanate mix will foam up through and around the interlacement of fibers. Polyurethane foam formed in this manner will lock the fibers within its structure and will possess greatly improved compression resistance and substantially improved resistance to compression set. The fiber-reinforced polyurethane foam, as compared to the non-reinforced foam, is capable of carrying comparatively greater loads for a given thickness of polyurethane foam, and is able to resist the continual compression load of heavy objects over a long period of time without establishing a compression set which is permanent and, hence a loss in cushioning properties.

The polymeric-isocyanate mix may be hand-mixed or mixed in an assembly such as shown in Freeman and Frentzel application Serial No. 585,509, filed May 17, 1956, and then added to the container. A predetermined quantity of polymeric-isocyanate mix should be added to the package because it will increase in volume 20–30 fold before the completed polyurethane foam is formed. Foaming may be effected in about one minute.

Dehydrated silica gel may be effectively incorporated into the polymeric-isocyanate mix so that the resulting polyurethane foam will have activated silica dispersed therein which exhibits a dehydrating influence on air. Activated silica may be formed by dehydrating silica gel at about 350–400° F. The activated silica may then be incorporated into the polymeric-isocyanate mix in such a manner that the mix rapidly forms polyurethane foam. The water present in the mix apparently reacts with the isocyanate component in such a manner that it does not substantially reduce the activity of the dehydrated silica gel.

The container may be closed or sealed either immediately after pouring the polymeric-isocyanate mix into the container or after the formation of the foam. In any event, the foaming rate is sufficiently rapid that the container and its contents may be handled in a few minutes.

In its completed form, the package will be surrounded by polyurethane foam in such a manner that the foam will serve to dissipate, instead of transmit, shock incurred by the container proper.

The employment of a polymeric-isocyanate mix and the formation of polyurethane foam having controlled density and tensile strength values constitute noteworthy features of my invention. Some of the advantages that result from the use of polyurethane foam, as compared to other foam or packaging products, are as follows: no heat is required to induce the formation of the foaming reaction; the polymeric-isocyanate mix may be foamed in place in a short period of time with simple equipment; polyurethane foam is capable of withstanding deterioration by solvents, oil, and greases, especially as compared to styrene foam; polyurethane is resistant to vermin, fungi, and insects, especially as compared to paper, cloth, wood, felt, and the like; it adheres to non-waxy and non-greasy surfaces when foamed in place, thus contributing to the structural strength of the package; it may be formed with low density properties, especially as compared to vinyl, rubber, or phenolic foams; polyurethane foam is moderately priced; it is flame retardant, especially as compared with polystyrene; it is not subject to deterioration at temperatures encountered in storage and, in this respect, is much superior to styrene foam and vinyl foam; it has good thermal insulating properties; it has good shock absorption properties, especially as compared to vinyl, rubber and styrene foams; and polyurethane foam has readily adjustable tensile strength, tear resistance, and density characteristics.

In the accompanying drawings, in which a few of the various embodiments of the invention are illustrated:

Figure 1:
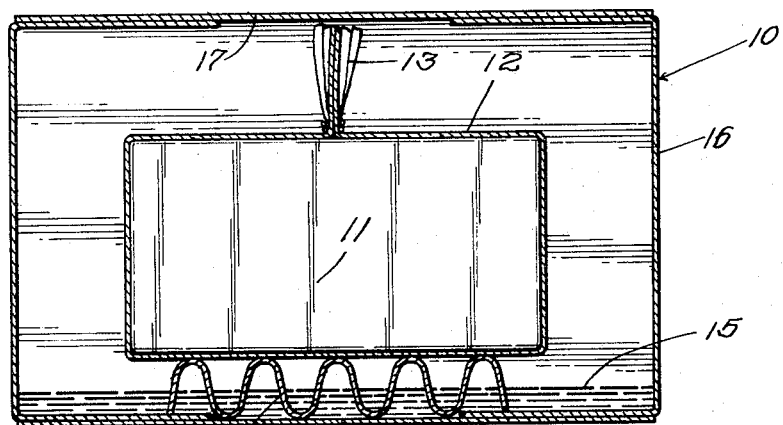
Figure 1 is a front sectional view of the package before the polymeric-isocyanate mix has reacted to form polyurethane foam.
Figure 2:
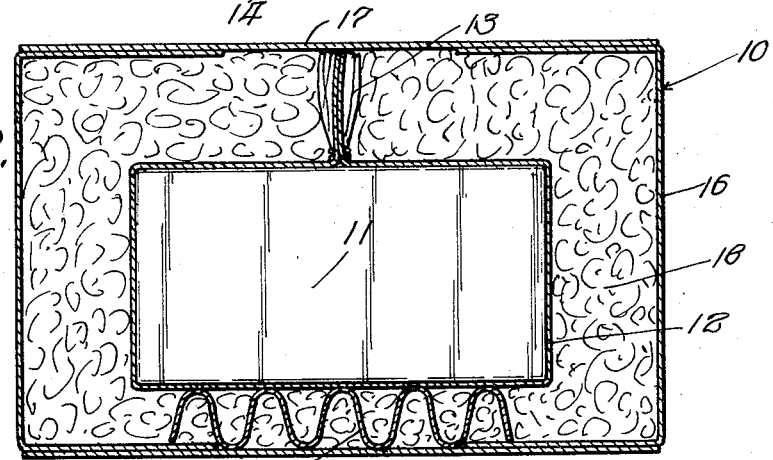
Figure 2 is a sectional view, similar to Fig. 1, after the mix has reacted to form polyurethane foam.

Figures 1 and 2 show package 10 comprising a cardboard container 16, an article 11 in a polyethylene bag 12 positioned on a corrugated, temporary support 14, and polymeric-isocyanate mix 15. The free end 13 of the bag 12 is sufficiently long so as to enable one to grab it after opening the top 17 of the container 16. The bag and article may be pulled from the polyurethane foam 18 by pulling on the free end 13 of the bag 12.

Figure 3:
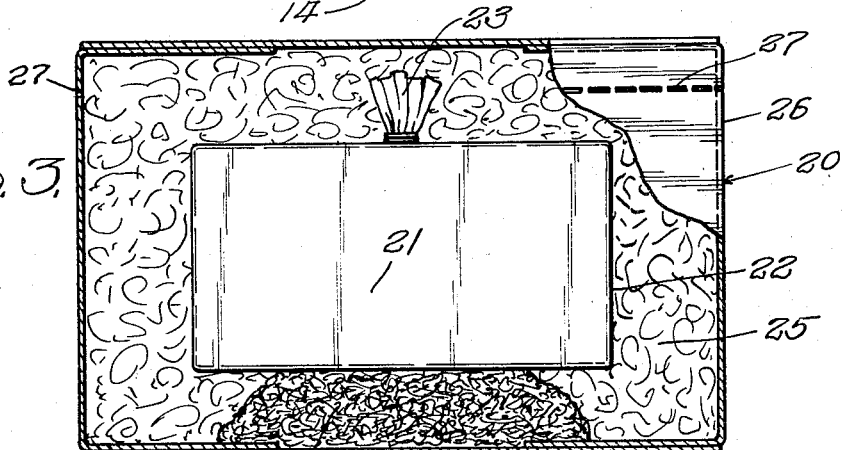
Figure 3 is a front sectional view of a second package after the mix has reacted to form polyurethane foam.

If desired, the free end of the bag may be embedded in the polyurethane foam, as shown in Figure 3. For example, when the foam has low density, low tensile strength values, the packaged article may readily be removed from the foam envelope without having the end of the protective bag as an access point. It is also feasible to use a strip of parchment paper, or other material having poor adhesion to the foam, as a dividing mechanism for creating a slit in the foam leading to the packaged article.

Figure 3 shows a package 20 comprising a paper container 26, an article 21 in a polyethylene bag 22 positioned on a preformed, reinforced, polyurethane foam support 24, and polyurethane foam 25. The free end 23 of the bag is shown embedded in the rupturable foam 25. The perforations 27 in the container 26 enable one to readily open the package and, in cases wherein the polyurethane foam has low density and tensile strength values, enable one to rupture the container and polyurethane in a single operation.

In the embodiments shown in the drawings, polyurethane foam surrounds the article that is packaged, and the support is constructed so that polyurethane foam is formed between the article and the container. It should be noted that even at the bottom of the container, polyurethane foam separates the bottom of the article from the bottom of the container; for example, the troughs and crests of the corrugations of the support member are either filled with or supported by polyurethane foam so that there is no rigid, force-transmitting structure directly between, or in vertical alignment with, the container and article. When the interior surfaces of the container are free of oily or greasy materials, the polyurethane foam will adhere to the container so as to be integral therewith; this enables the container to more readily dissipate forces exerted upon the exterior surfaces of the package.

The polyurethane foam used in forming my package may have a density of about 1.4–20 pounds/ft.$^3$ and a tensile strength up to about 30 p.s.i. When the density is about 1.4–1.5 pounds/ft.$^3$ and the tensile strength is less than about 5 p.s.i., the foam shall herein be referred to as low density, low tensile strength foam; high density, high tensile strength foam is herein intended to refer to foam having a density of about 3.5–20 pounds/ft.$^3$ and tensile strength of about 25–30 p.s.i. Foam having density and tensile strength values between the low density, low tensile strength foam and the high density, high tensile strength foam, shall herein be considered as an intermediate foam.

Polyurethane foam having low density, low tensile strength values offers many significant advantages over the intermediate foam and the high density, high tensile strength foam, and its use constitutes one of the notable feature of my invention. For example, low density, low tensile strength foam is comparatively less expensive to produce, is very light, cures almost instantaneously without any residual surface tack, and has a tensile strength that enables it to be readily ruptured or torn from the container so as to facilitate removal of the packaged article.

High density, high tensile strength polyurethane foam may also be used, but it does not offer the advantages of the low density, low tensile strength foam. It may be formed so as to have sufficient strength to form a preformed molded cover around the packaged article which may be separated into two or more sections; this facilitates removal of the packaged article. The foam has sufficient strength to withstand handling and, if desired, may be reused.

Polyurethane foam may be produced by reacting an alkyd resin component containing an alkyd resin (e.g., condensation product of polyhydric alcohol and polycarboxylic acid), water, catalyst and, preferably, an emulsifier with a polyisocyanate component. Polyurethane foam may also be produced by reacting an alkyd resin with a sufficient amount of polyisocyanate so as to make a prepolymer containing unreacted NCO groups; the prepolymer may then be reacted with water or a water-catalyst mix to produce a foamed reaction product. Insoluble, inert additives such as hydrated silica pigment or ferric oxide may be incorporated into the polymeric-isocyanate mix in the manner set forth in Freeman application Ser. No. 540,629, filed October 14, 1955, in order to produce polyurethane foams having controllable, uniform cell sizes. The polymeric-isocyanate mix may be admixed in and ejected from a mixing device such as described in Freeman and Frentzel application Ser. No. 585,509, filed May 17, 1956.

The alkyd resin may be the reaction product of a polyhydric alcohol and polybasic acid unmodified or modified with oil and/or other resins, and the like. For example, a suitable alkyd resin may be produced by reacting saturated acids such as adipic acid with diethylene glycol and trimethylol ethane. Unsaturated dibasic acids could be wholly or partially substituted for the saturated acid, but tend to produce a polyurethane foam that possesses comparatively less durability on aging.

The polymeric material may also contain or consist of a polyether or a natural polyester such as castor oil. In using the polyether, a prepolymer of the polyether and isocyanate should be used.

Conventional polyisocyanates which are used in the production of polyurethane foam, such as toluene diisocyanates, may be used.

The activated silica may be added with the polyisocyanate component to the polymeric component so as to delay contacting the activated silica with water until occurrence of the foam-forming reaction. The amount of activated silica that may be incorporated into the polymeric-isocyanate mix is generally a matter of choice; however, effective mixing of the polymeric component and polyisocyanate component will not be accomplished when excessive levels of activated silica are used. I have found that excellent foam could be produced when 25% by weight of the foam was activated silica.

My invention will be further illustrated by the following examples, wherein the composition of suitable polymeric-isocyanate mixes are described.

*Example I*

A polymeric admixture may be prepared by admixing 65.15 parts by weight Chempol FR–1107 (adipic acid-diethylene glycol-trimethylol ethane reaction product produced by Freeman Chemical Corporation, Port Washington, Wisconsin), 1.87 parts by weight of N-methyl morpholine, 0.08 part by weight pine oil, 1.52 parts by weight Witco 77–86 (emulsifying agent), 0.42 part by weight Cab-O-Sil (finely divided silica) and 6.46 parts by weight water.

24.50 parts by weight of toluene diisocyanate (80% 2,4 isomer, 20% 2,6 isomer) should be added to the polymeric admixture. Foaming proceeds in a few seconds. The resulting polyurethane foam is a low density, low tensile strength foam.

*Example II*

A high density, high tensile strength foam may be prepared by mixing 24.95 parts by weight toluene diisocyanate with a polymeric admixture of 71.2 parts by weight Chempol FR–1107, 0.89 part by weight Pluronic L–61 and 0.35 part by weight Pluronic L–62 (condensates of ethylene oxide with a hydrophobic base formed by condensing propylene oxide with propylene glycol, produced by Wyandotte Chemicals Corp.), 2.14 parts by weight water, and 0.47 part by weight N-methyl morpholine.

The foregoing detailed description has been given for clearness of understanding only, and no unnecessary limitations should be understood therefrom, as modifications will be obvious to those skilled in the art.

I claim:
1. The method of packaging fragile articles, which comprises: inserting the fragile article to be packaged through a filling opening into a protective envelope thereby encapsulating said article, said envelope being positioned inside of a container having an open top in spaced relationship to the closed bottom thereof, said filling opening of the envelope being positioned adjacent said top opening of the container; adding a liquid, foamable, polyurethane reaction mixture which forms solid cellular polyurethane into said container around said encapsulated article; and foaming said liquid reaction mixture upwardly around the encapsulated article to the top of the container thereby embedding said encapsulated article in a solid, readily rupturable, energy-absorbing, cellular polyurethane envelope-cushion without directly contacting said article, the filling opening of said protective envelope being positioned at the top plane of the rupturable envelope-cushion, said cellular envelope-cushion having a density of not more than about 20 pounds/ft.$^3$, a tensile strength of not more than about 30 p.s.i., and being capable of being formed from said liquid reaction mixture at room temperatures and atmospheric pressures.

2. The method of packaging fragile articles, which comprises: inserting the fragile article to be packaged through a filling opening into a protective envelope thereby encapsulating said article, said envelope being positioned inside of a container having an open top in spaced relationship to the closed bottom thereof, said filling opening of the envelope being positioned adjacent said top opening of the container; adding a liquid, foamable, polyurethane reaction mixture which forms solid cellular polyurethane into said container around said encapsulated article; and foaming said liquid reaction mixture upwardly around the encapsulated article to the top of the container thereby embedding said encapsulated article in a solid, readily rupturable, energy-absorbing, cellular polyurethane envelope-cushion without directly contacting said article, said filling opening of said envelope being positioned at the top plane of said envelope-cushion so as to be accessible upon opening a top portion of the container, said cellular envelope-cushion having a density of not more than about 3.5 pounds/ft.$^3$, a tensile strength of not more than about 30 p.s.i., and being capable of being formed from said liquid reaction mixture at room temperatures and atmospheric pressures.

3. The method of claim 2 wherein said liquid reaction mixture has activated silica dispersed therein.

4. The method of packaging fragile articles, which comprises: inserting the fragile article to be packaged through a filling opening into a protective envelope thereby encapsulating said article, said envelope being positioned inside of a container having an open top in spaced relationship to the closed bottom thereof, said filling opening of the envelope being positioned adjacent said top opening of the container; an unoriented interlacement of fibers being positioned in said container around said encapsulated article; adding a liquid, foamable, polyurethane reaction mixture which forms solid cellular polyurethane into said container around said encapsulated article; and foaming said liquid reaction mixture upwardly around the encapsulated article to the top of the container thereby embedding said encapsulated article in a solid, readily rupturable, energy-absorbing, cellular polyurethane envelope-cushion without directly contacting said article, said filling opening of said envelope being positioned at the top plane of said envelope-cushion so as to be accessible upon opening a top portion of the container, said cellular sheath having a density of not more than about 3.5 pounds/ft.$^3$, a tensile strength of not more than about 30 p.s.i., and being capable of being formed from said liquid reaction mixture at room temperatures and atmospheric pressures, said fibers being embedded in said envelope-cushion and serving to improve the compression resistance and compression set thereof.

5. The method of claim 4 wherein said liquid reaction mixture has activated silica dispersed therein.

6. A rupturable package containing a fragile article, which comprises: a container; a solid readily rupturable energy-absorbing cellular polyurethane envelope-cushion enclosed therein, said envelope-cushion having a density of not more than about 20 lbs./ft.$^3$ and a tensile strength of not more than about 30 p.s.i.; a protective bag embedded within said envelope-cushion and located with its filling opening positioned at the top plane of the rupturable envelope-cushion and adjacent to the top of the container so that upon opening a top portion of the container the filling opening of the bag is exposed; and an article within said bag.

7. The package of claim 6 wherein the envelope-cushion is integral and which includes positioning means for positioning said bag in spaced relationship to said container independent of said cellular polyurethane.

8. The package of claim 6 wherein said solid, cellular polyurethane envelope-cushion has a density of not more than about 3.5 pounds/ft.$^3$ and a tensile strength of not more than about 30 p.s.i.

9. The package of claim 6 wherein said solid, cellular polyurethane envelope-cushion has a density of not more than about 1.4 pounds/ft.$^3$ and a tensile strength of not more than about 25 p.s.i.

10. The package of claim 6 wherein said solid, cellular polyurethane envelope-cushion has a density of not more than about 1.4 pounds/ft.$^3$ and a tensile strength of not more than about 5 p.s.i.

11. The package of claim 6 wherein said envelope-cushion is a water-polyether-polyisocyanate reaction product.

12. The package of claim 6 wherein said envelope-cushion is a water-polyester-polyisocyanate reaction product.

13. The package of claim 6 wherein said envelope-cushion has an unoriented interlacement of fibers embedded therein.

14. The package of claim 6 wherein said envelope-cushion has an unoriented interlacement of fibers embedded therein and activated silica dispersed therein.

References Cited in the file of this patent
UNITED STATES PATENTS

| | | |
|---|---|---|
| 1,489,943 | Jeffries | Apr. 8, 1924 |
| 1,988,843 | Heldenbrand | Jan. 22, 1935 |
| 2,638,179 | Yard | May 12, 1953 |
| 2,780,350 | Simon et al. | Feb. 5, 1957 |
| 2,785,739 | McGregor et al. | Mar. 19, 1957 |

FOREIGN PATENTS

| | | |
|---|---|---|
| 732,921 | Great Britain | June 29, 1955 |

OTHER REFERENCES

"Modern Packaging," page 51, February 1954.
"Modern Plastics," pages 106–108, 214–216, November 1954.